United States Patent [19]

Thomas et al.

[11] Patent Number: 4,539,496

[45] Date of Patent: Sep. 3, 1985

[54] EXTERNALLY MOUNTED GENERATORS FOR PNEUMATIC WHEELS

[76] Inventors: Stephen E. Thomas, 4015 Heron Pl., Fremont, Calif. 94536; Mark S. Thomas, 3770 Flora Vista, Santa Clara, Calif. 95051

[21] Appl. No.: 599,144

[22] Filed: Apr. 11, 1984

[51] Int. Cl.³ .................... H02K 11/00; B60C 23/04
[52] U.S. Cl. ................... 310/68 B; 310/67 A; 340/58
[58] Field of Search ............ 73/146.5; 340/58; 310/68 B, 67 A, 75 C; 290/1 R, 53

[56] References Cited

U.S. PATENT DOCUMENTS

| | | | |
|---|---|---|---|
| 2,494,831 | 1/1950 | Phelps | 73/146.5 |
| 4,229,728 | 10/1980 | Tremba | 310/68 B |

FOREIGN PATENT DOCUMENTS

| | | | |
|---|---|---|---|
| 701355 | 1/1941 | Fed. Rep. of Germany | 310/67 A |
| 708174 | 7/1941 | Fed. Rep. of Germany | 310/67 A |

Primary Examiner—Peter S. Wong
Assistant Examiner—D. L. Rebsch
Attorney, Agent, or Firm—Paul L. Hickman

[57] ABSTRACT

A generator assembly characterized by a hubcap and an elongated arm attached at a first end to a central portion of the hubcap such that it may freely rotate therein. A generator is attached to the second end of the arm which is operative to produce electrical power as the hubcap rotates. Because of the generator's offset position there is a "step-up" effect of the mechanical power supplied to the generator, thus increasing the electrical power developed by the generator. The elongated arm can also be attached to the wheel lugs of the wheel by a suitable frame, or may be manufactured as an integral part of a wheel or hubcap.

9 Claims, 10 Drawing Figures

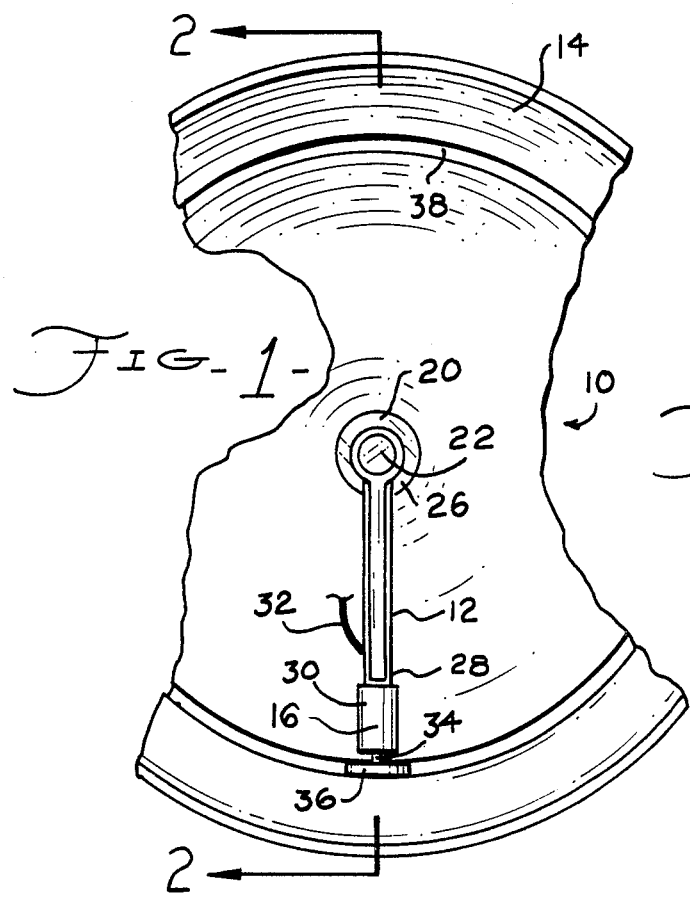
FIG-1-
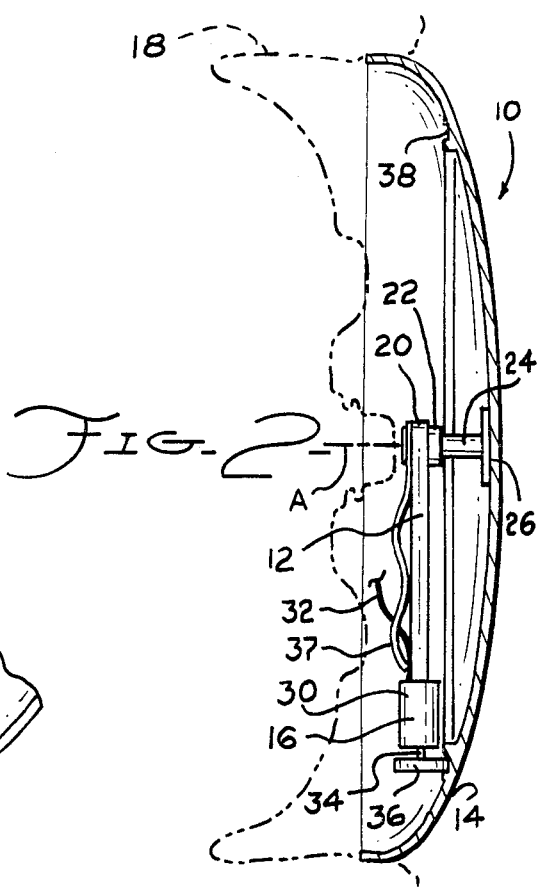
FIG-2-
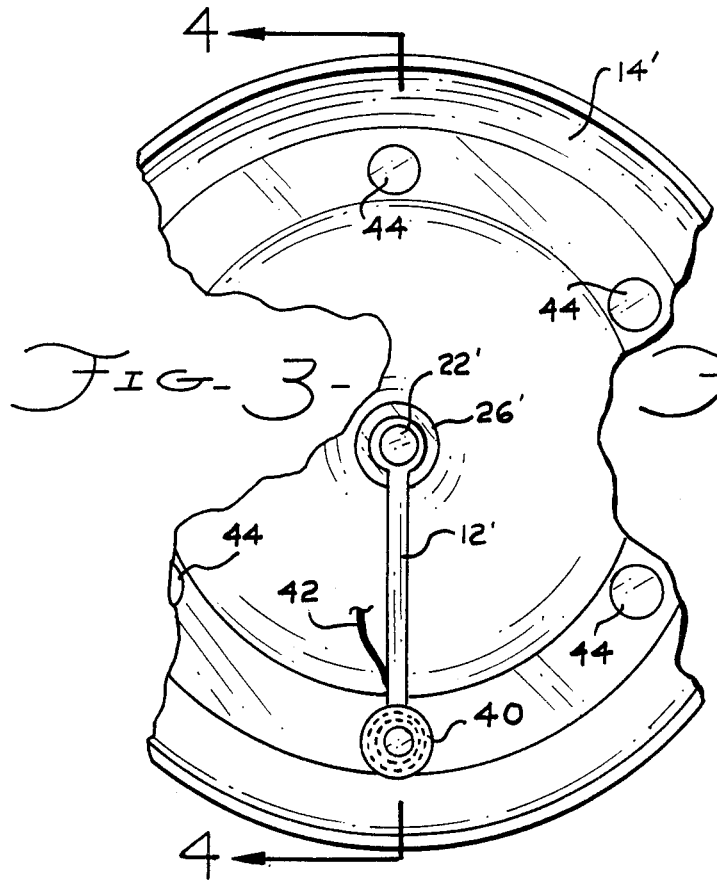
FIG-3-
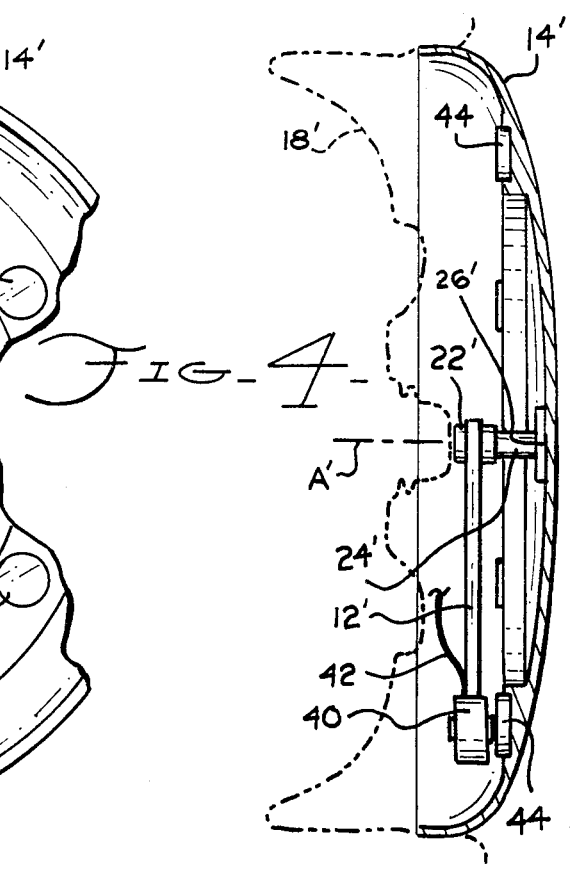
FIG-4-

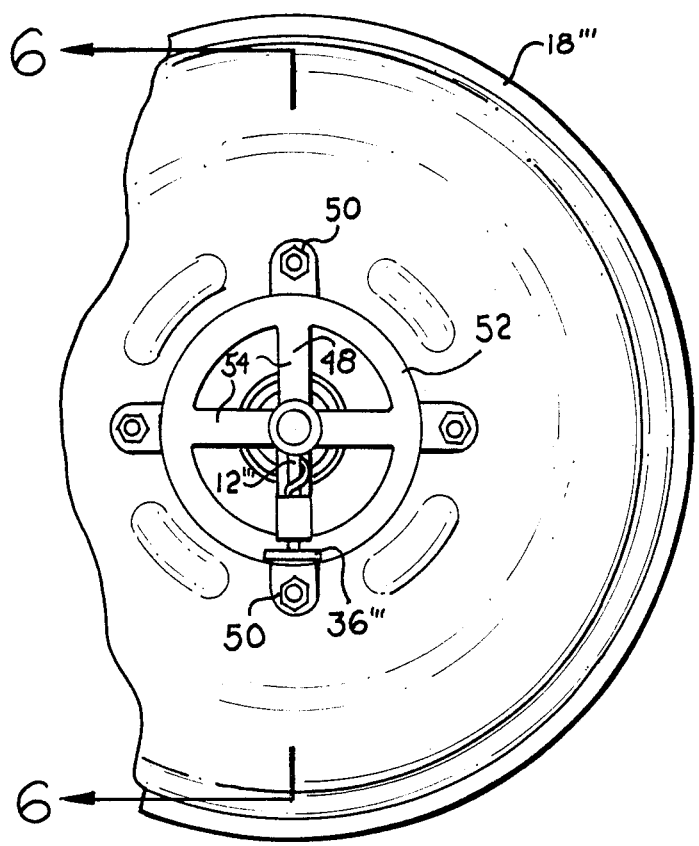
Fig. 5
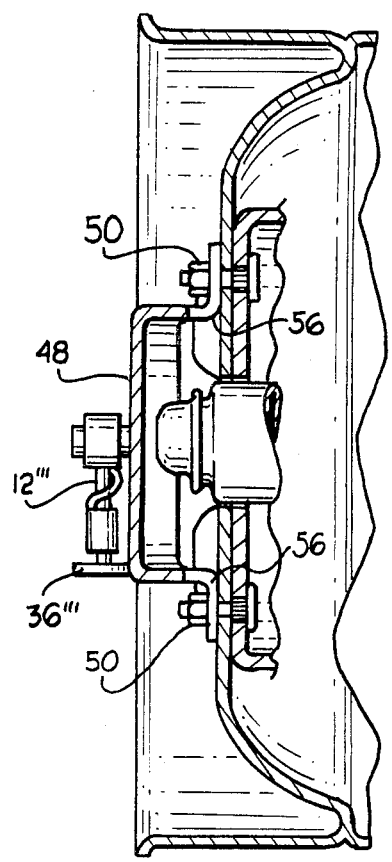
Fig. 6
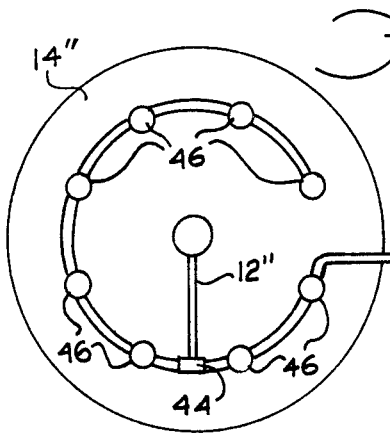
Fig. 4-a-
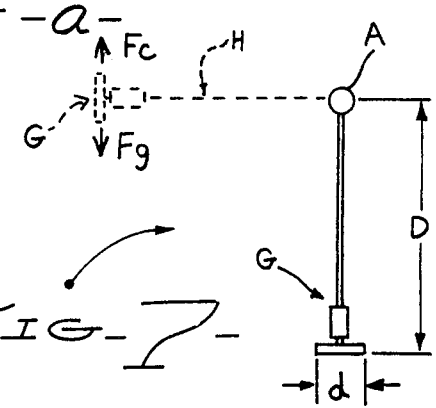
Fig. 7
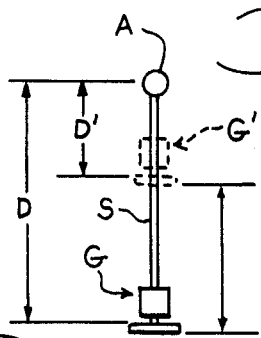
Fig. 8-a-
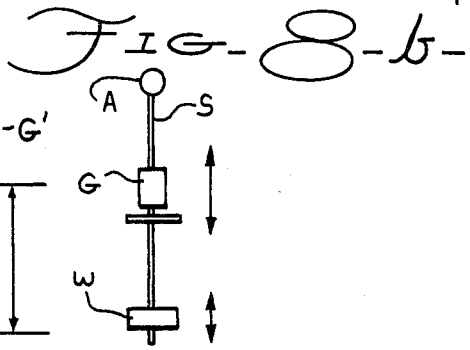
Fig. 8-b-

EXTERNALLY MOUNTED GENERATORS FOR PNEUMATIC WHEELS

BACKGROUND OF THE INVENTION

1. Field of the Invention

This invention relates generally to electric generators and more particularly to electric generators which are powered by the rotation of a wheel assembly.

2. Description of the Prior Art

It is often desirable to have a source of electrical power located at the wheel of a car. For example, monitoring devices could be provided at the wheel to detect when the tire pressure is low, or the wheel temperature is too high. Also, visual safety devices such as wheel lights could be provided to make the car more visible under night driving conditions.

Batteries are an inexpensive and convenient power source, but suffer from the disadvantage that they will, with time, become discharged and inoperable. Because of this problem a number of devices have been developed which attach a generator to the outside of the wheel to provide small amounts of electric power.

For example, in U.S. Pat. No. 4,229,728 of Tremba, a hubcap generator is disclosed including a permanent magnetic attached to a weighted pendulum which is supported by a centrally located pin. A pickup coil is wrapped around a core such that as the wheel is rotated, the core rotates with it and the permanent magnet remains stationary.

A problem with wheel mounted generators of the prior art is that the amount of power produced by such devices is small. The power provided may be sufficient for sensing circuits which draw relatively little power, but tend to be inadequate for high power applications such as illuminating safety lights attached to the wheel.

Another problem with the prior art generators is that their output at slow speeds is so small that the sensing circuits that they power may become inoperable. Furthermore, the power output to weight ratio of prior art generators is very poor.

SUMMARY OF THE INVENTION

A major object of this invention is to provide a generator assembly which conveniently attaches to a wheel assembly.

Another object of this invention is to provide a generator assembly which provides relatively large amounts of electric power.

Briefly, the invention comprises an elongated arm, an assembly for coupling a first end of the arm to the wheel at the wheel's axis of rotation, and electrical generating means attached to the second end of the arm. As the wheel is rotated the relative motion between the wheel and the second end of the arm causes the generator to produce electrical power.

A major advantage of this invention is that the generator can produce relatively large amount of electrical power, because of its offset position from the axis of rotation of the wheel. There is, in effect, a gear "step-up" of the mechanical driving force for the generator due to its non-axial position. The amount of step-up will be determined by the ratio of the length of the arm to the diameter of the generator's flywheel. Thus, the longer the arm, the greater the step-up effect and the greater the electrical output for a given generator and wheel RPM.

The arm may be attached to the wheel in a number of ways. For example, the first end of the arm can be rotatably attached to a support post affixed to a hubcap such that the arm and the hubcap can rotate independently. Alternatively, the first end of the arm can be rotatably attached to a support frame engaged with the wheel lugs of the wheel assembly. The hubcap mounted apparatus is advantageous, in that it is easy to install and remove, and the wheel-lug mounted apparatus is advantageous in that it is more rugged and secure.

While a conventional generator including a stator and a rotor are preferably used to generate the electrical power, various other coils-and-magnet assemblies are also suitable. The electrical power generated by the present invention can be used for any suitable purpose such as powering electronic sensors, safety lights, decorative items, etc.

These and other objects and advantages of the present invention will no doubt become apparent upon a reading of the following descriptions and a study of the several figures of the drawing.

BRIEF DESCRIPTION OF THE DRAWING

FIG. 1 is a rear elevational view of a generator assembly in accordance with the present invention.

FIG. 2 is a cross sectional view taken along line 2—2 of FIG. 1.

FIG. 3 is a rear elevational view of an alternate embodiment of the present invention.

FIG. 4 is a cross sectional view taken along line 4—4 of FIG. 3.

FIG. 4a is a pictorial representation of another embodiment of this invention.

FIG. 5 is a front elevational view of another embodiment of the present invention.

FIG. 6 is a cross sectional view taken along line 6—6.

FIG. 7 is a pictorial view used to describe the theory of operation of the present invention.

FIG. 8a is a pictorial view illustrating a generator assembly adjustably coupled to a support arm such that the radial displacement of the generator assembly may be varied.

FIG. 8b is the pictorial view of FIG. 8a with the addition of a weight adjustably attached to the end of the support arm.

DETAILED DESCRIPTION OF THE PREFERRED EMBODIMENT(S)

Referring to FIGS. 1 and 2, a generator assembly 10 in accordance with the present invention includes elongated rotor or arm 12, a hubcap 14, and generator 16. The hubcap 10 attaches to the wheel 18 of a pneumatic wheel assembly which has an axis of rotation A.

Arm 12 has a first end 20 attached to a bearing 22 supported by a support post 24. The support post 24 is attached to hubcap 14 by a base plate 26. This bearing support for first end 20 of arm 12 allows the arm 12 to freely rotate around axis A when hubcap 14 is engaged with wheel 18.

Generator 16 is attached to a second end 28 of arm 12 and is conventional in design in that it includes a stator coil located within a case 30, an output wire 32 coupled to the stator coil, a rotor shaft 34 attached to a rotor within case 30, and a drive or flywheel 36 attached to rotor shaft 34. A biasing spring 37 is provided to urge the drive wheel 36 against hubcap 10. As wheel 36 is rotated, electrical power is provided on output wires 32.

As best seen in the cross-sectional view of FIG. 2, hubcap 14 is preferably provided with an annular groove 38 which serves as a track for flywheel 36. The wheel 36 as shown in this figure is preferably of the friction drive type, but alternatively could be pneumatically driven by providing a small air gap between wheel 36 and groove 38. Of course, magnetic coupling or other coupling methods well known to those skilled in the art are also possible.

The alternate embodiment of FIGS. 3 and 4 is similar to the embodiment of FIGS. 1 and 2, in that it includes an arm 12' attached to a hubcap 14' by support assembly including a bearing 22', support post 24', and a base plate 26'. The generator means, however, for this alternate embodiment includes a coil 40 attached to the second end of arm 12'. Output wires 42 are attached to coil 42 and can be used to power the various aforementioned loads. Hubcap 14' is provided with a plurality of permanent magnets 44 which induces electric current in coil 40 as the wheel 18' is rotated.

As illustrated schematically in FIG. 4a, the coil-and-magnet arrangement of FIGS. 3 and 4 can be reversed by having an arm 12" provided with a permanent magnet 44 which sweeps past a number of coils 46 attached to the inner surface of a hubcap 14". This arrangement may be advantageous for applications where the devices to be powered are attached directly to the hubcap 14", since no commutator is necessary.

Referring to FIG. 5, an alternate structure for attaching arm 12''' to a wheel 18''' is with a support frame 48 attached to the wheel lugs 50 of the wheel. In the embodiment shown, the support frame 48 includes an annular portion 52 and a number of braces 54. The annular portion 52 is attached to lugs 50 with leg portions 56. As the wheel 18''' is rotated, the drive wheel 36''' is frictionally driven by annular portion 52.

Referring now to FIG. 7, the aforementioned "step-up" effect of the present invention is due to the distance D between the axis of rotation A and the generator position G. In the case of the generator embodiments of FIGS. 1, 2, 5, and 6 the step-up will equal the ratio of the arm length D to the diameter d of the generator's flywheel. Thus, the longer the arm length D, the greater the power output of the generator G.

The maximum power output for a given generator and a given speed will occur when the coupling force of the rotor is equal to the force required to raise the generator to the horizontal position shown at H. This is indicated schematically by the $F_C$ (the force of coupling) arrow and the $F_G$ (the force of gravity) arrow. When the coupling force exceeds this condition, the generator and wheel will rotate together. In other words, the maximum power available from generator G will occur when the generator is in the horizontal position.

In FIG. 8a, an embodiment of this invention is shown wherein the generator G is adjustably attached to the support arm S. As illustrated in the figure, the generator G can slide up arm S to a new position G' where it can be held in position such as by a set screw. By moving generator G to position G', the distance between the generator and the axis A goes from D to D'. This will reduce the output of the generator for a given RPM, and will also reduce the drag exerted on the rotating wheel. Furthermore, the variable generator position allows the device to be adjusted for various wheel sizes.

In FIG. 8b, the generator G is once again adjustably attached to arm S, and can be positioned up or down and then affixed to the arm S. This embodiment also includes an adjustable weight W which can also be moved up or down arm S and then affixed to the arm with a set screw or the like.

Of course, with the embodiments of FIGS. 8a and 8b, there should not be any protuberances or recesses in the drive surface along the path that the drive wheel must travel as the position of generator G is adjusted along arm S. Thus, the annular groove 38 in the hubcap 14 as illustrated for the embodiment of FIGS. 1 and 2 would be inappropriate for the adjustable position generator embodiments illustrated in FIGS. 8a and 8b.

The weight W allows the torque exerted by the arm S to be varied. In the prior embodiments, the generator provided the necessary weight to keep the arm S from rotating with the wheel. However, as the generator G is moved towards axis A, the torque required to rotate the arm S becomes correspondingly less. The weight W can be used to set the torque at a range of desired levels.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A generator assembly for a rotatable wheel having a first axis of rotation, said generator assembly comprising:
    an elongated arm;
    free bearing means rotatably coupling a portion of said arm proximate a first end thereof to said wheel proximate said first axis of rotation such that said arm is extending substantially radially and perpendicular from said first axis of rotation of said wheel, and such that said wheel can rotate without substantially rotating said arm, said free bearing means permitting said arm to move in both a clockwise and a counterclockwise direction relative said first axis of rotation;
    generating means attached to a portion of said arm proximate a second end thereof, said generating means being operative to develop electric power from the rotation of said wheel, said generating means including a housing rigidly coupled to said arm, a stator affixed within said housing, rotor disposed within said housing for rotation therein around a second axis which is substantially parallel to said arm and perpendicular to said first axis of rotation, a shaft coaxially coupled to said rotor and extending from said housing, and a drive wheel attached to an end of said shaft; and
    a driving surface coupled to said wheel for mutual rotation therewith, said drive wheel being tangentially engaged with said driving surface such that rotation of said wheel around said first axis causes said drive wheel to rotate around said second axis.

2. A generator assembly for a rotatable wheel having a first axis of rotation and a rim, said generator assembly comprising:
    an elongated arm;
    bearing means rotatably coupling a portion of said arm proximate a first end thereof to said wheel proximate said first axis of rotation such that said arm is extending substantially radially and perpendicular from said first axis of rotation of said wheel, and such that said wheel can rotate without rotating said arm;

generating means attached to a portion of said arm proximate a second end thereof, said generating means being operative to develop electric power from the rotation of said wheel, said generating means including a housing rigidly coupled to said arm, a stator affixed within said housing, a rotor disposed within said housing for rotation therein around a second axis which is substantially parallel to said arm and perpendicular to said first axis of rotation, a shaft coaxially coupled to said rotor and extending from said housing, and a flywheel attached to an end of said shaft;

a driving surface coupled to said wheel for mutual rotation therewith, said flywheel being tangentially engaged with said driving surface such that rotation of said wheel around said first axis causes said flywheel to rotate around said second axis; and wherein said generating means is adjustably attached to said arm such that the radial displacement of said flywheel relative said first axis of rotation may be varied and set at a user selectable position which remains fixed during the rotation of said wheel.

3. A generator assembly as recited in claim 2 further comprising weight means adjustably attached to said arm such that the radial displacement of said weight means relative said axis of rotation is adjustable.

4. A generator assembly as recited in claim 1 further comprising weight means adjustably attached to said arm such that the radial displacement of said weight means relative said axis of rotation is adjustable.

5. A generator assembly as recited in claim 1 wherein further comprising a hubcap engagable with said rim, said hubcap including an axle engaged with said bearing means, and including an inner surface comprising said driving surface.

6. A generator assembly as recited in claim 1 further comprising a frame engaged with the wheel lugs of said wheel, said frame having an axle engaged with said bearing means and an annular surface comprising said driving surface.

7. A generator assembly as recited in claim 1 further comprising means for biasing said generating means towards said driving surface to increase the frictional engagement between said flywheel and said driving surface.

8. A generator assembly as recited in claim 1 further comprising means for biasing said drive wheel towards said driving surface.

9. A generator assembly for a rotatable wheel having a first axis of rotation, said generator assembly comprising:

a support member;

free bearing means rotatably coupling said support member to said wheel, such that said wheel can rotate without rotating said support member, said free bearing means permitting said support member to move in both a clockwise and a counterclockwise direction relative said wheel;

generating means attached to a portion of said support member distal from said first axis of rotation, said generating means being operative to develop electric power from the rotation of said wheel, said generating means including stator means attached to said support member, rotor means rotatably attached to said support member for rotation around a second axis which is substantially perpendicular to said first axis of rotation of said wheel, and a drive wheel coupled to a said rotor; and a driving surface coupled to said wheel for mutual rotation thereweith, said drive wheel being tangentially engaged with said driving surface such that rotation of said wheel around said first axis causes said drive wheel to rotate around said second axis.

* * * * *